United States Patent [19]
Ouellette

[11] Patent Number: 5,810,516
[45] Date of Patent: Sep. 22, 1998

[54] APPARATUS AND METHOD FOR STABILIZING AN ARTICLE CONVEYED IN A CONVEYOR SYSTEM

[75] Inventor: Joseph F. Ouellette, Glendale, Mo.

[73] Assignee: Ouellette Machinery Systems, Inc., Fenton, Mo.

[21] Appl. No.: 792,886

[22] Filed: Jan. 31, 1997

Related U.S. Application Data

[63] Continuation-in-part of Ser. No. 292,079, Aug. 17, 1994, Pat. No. 5,611,647.
[51] Int. Cl.$^6$ ..................................................... B65G 51/02
[52] U.S. Cl. ............................... 406/86; 406/88; 406/182
[58] Field of Search .................................. 406/86, 87, 88, 406/182

[56] References Cited

U.S. PATENT DOCUMENTS

| | | | |
|---|---|---|---|
| 4,284,370 | 8/1981 | Danler et al. | 406/86 |
| 4,822,214 | 4/1989 | Aidlin et al. | 406/86 |
| 5,028,174 | 7/1991 | Karass | 406/88 |
| 5,147,153 | 9/1992 | Aidlin et al. | 406/86 |
| 5,161,919 | 11/1992 | Smith et al. | 406/86 |

FOREIGN PATENT DOCUMENTS

| | | |
|---|---|---|
| 2580609 | 10/1986 | France . |
| 90/10587 | 9/1990 | WIPO . |

*Primary Examiner*—Andrew C. Pike
*Attorney, Agent, or Firm*—Howell & Haferkamp, L.C.

[57] ABSTRACT

A conveyor system for conveying an article has an upper portion and a lower portion below the upper portion. The conveyor system comprises a guide mechanism configured for engaging the upper portion of the article in a manner so that the article is suspended from the guide mechanism. The guide mechanism is further configured for guiding the article in its suspended orientation along a conveyor pathway defined by the guide mechanism, the conveyor pathway having a lateral curve. The conveyor system further includes at least one air nozzle for connection to a source of pressurized air. The air nozzle is oriented for directing a stream of air in a direction generally adjacent the lateral curve and in a manner such that the stream of air blows against the lower portion of the article when the article is moving along the lateral curve of the conveyor pathway to counter inertial forces which tend to cause the article to deviate from the conveyor pathway.

21 Claims, 10 Drawing Sheets

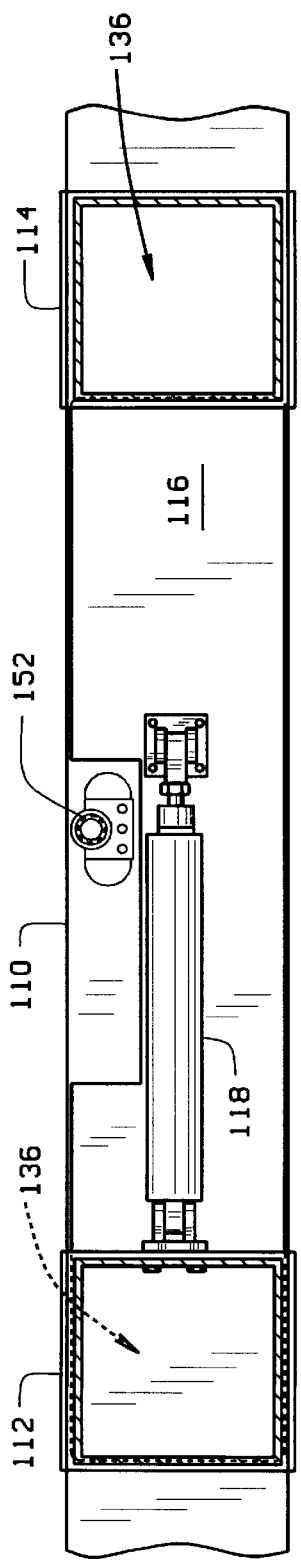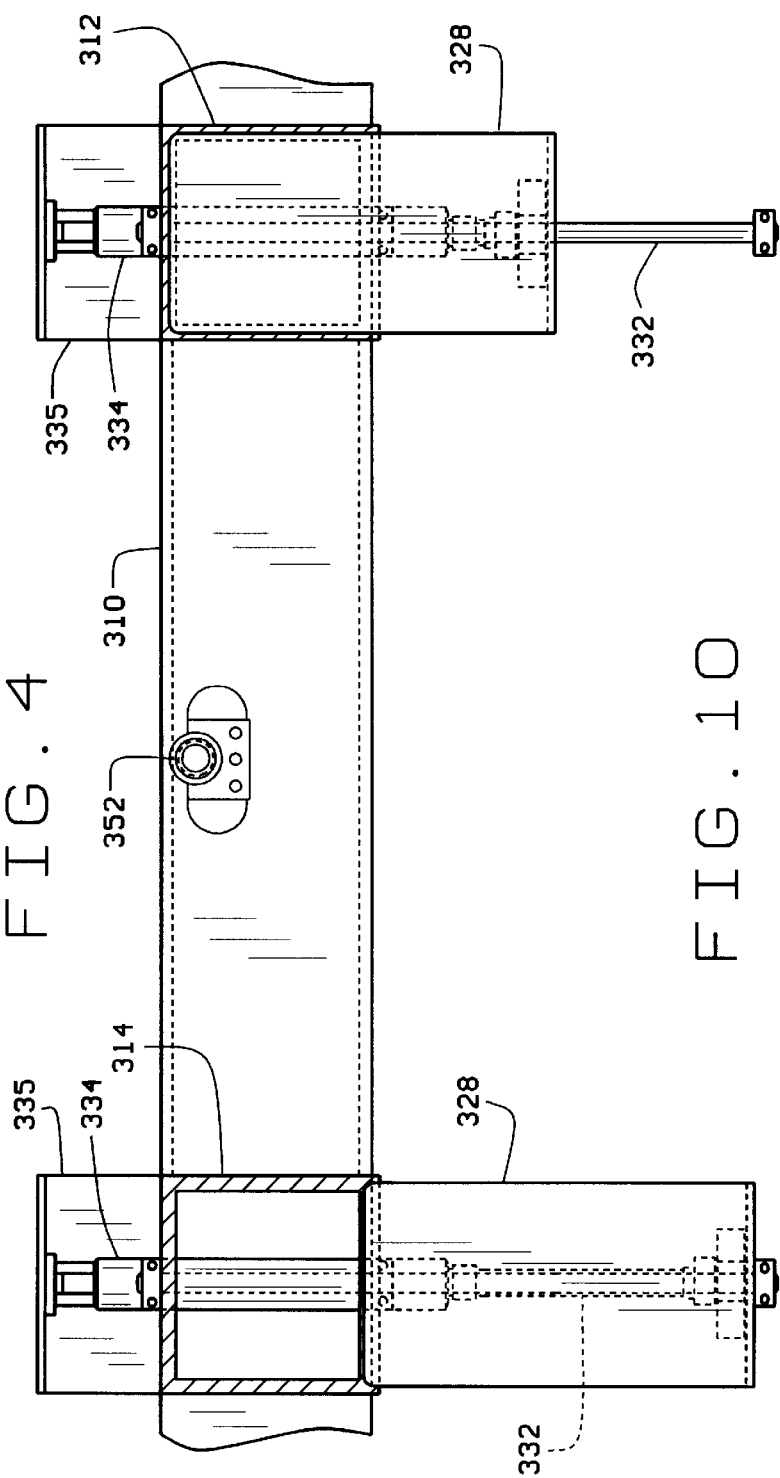

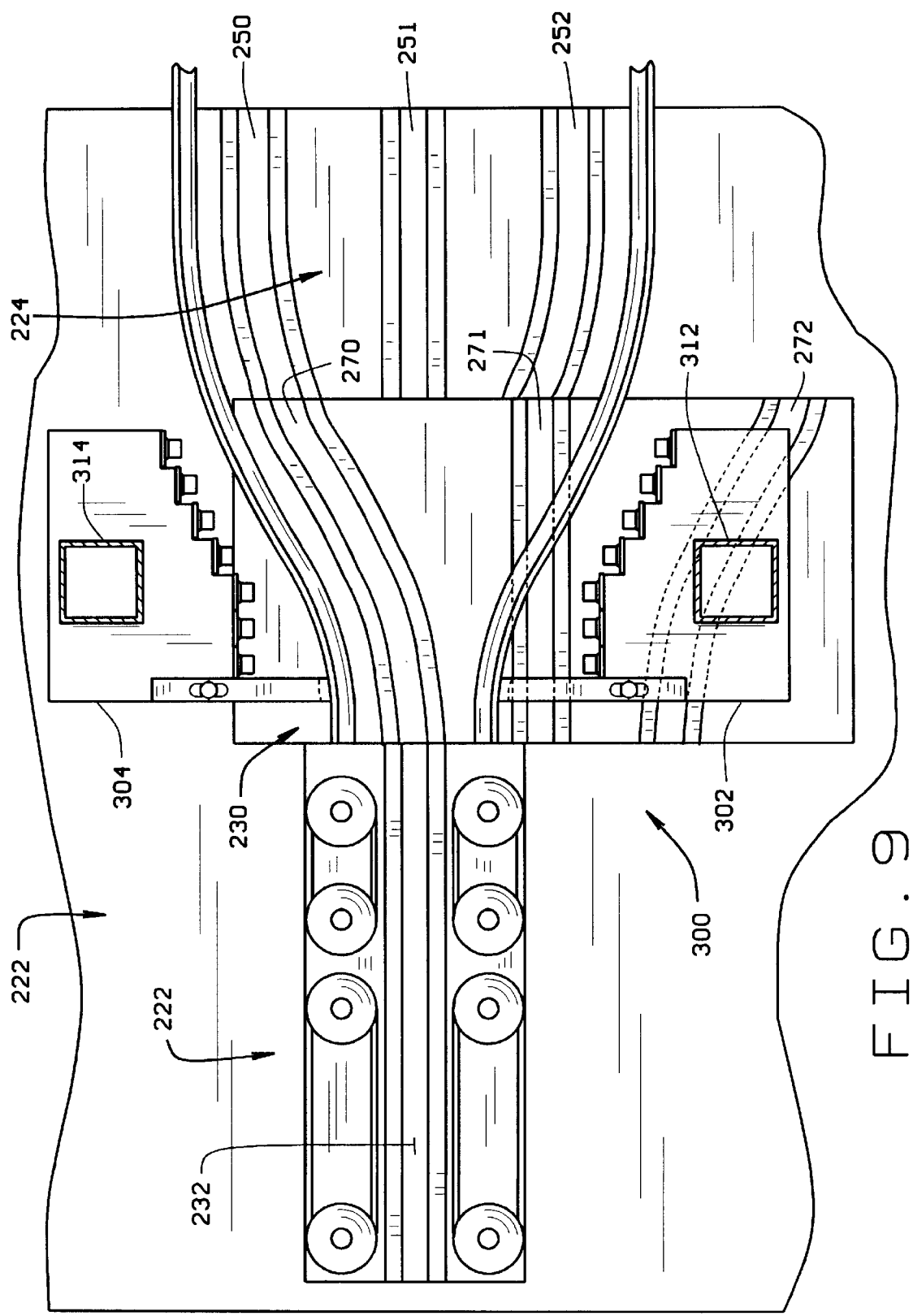

APPARATUS AND METHOD FOR STABILIZING AN ARTICLE CONVEYED IN A CONVEYOR SYSTEM

This is a continuation-in-part application of application Ser. No. 08/292,079, filed Aug. 17, 1994, now U.S. Pat. No. 5,611,647, issued Mar. 18, 1997.

BACKGROUND OF THE INVENTION

This invention relates to conveyor systems for conveying articles, and more particularly to apparatus and methods for stabilizing articles conveyed along a curve.

An air conveyor is used for rapidly transporting plastic bottles between work stations as, for example, between a storage station and a bottle-filling station. A typical air conveyor includes a pair of flanges spaced to define an elongate slot and a series of air jet heads on opposite sides of the slot. The construction of these air jet heads is similar to that disclosed in U.S. Pat. No. 5,611,647, referenced earlier. Plastic bottles are formed with annular rims adjacent the tops of their necks. With the bottle necks extending through the slot and the rims overlying the spaced flanges, the bottles are suspended from the flanges and hang below the slot. Pressurized air from the air jet heads is directed in streams toward the bottles. The bottles move through the slot because of the force of the air streams against the bottles.

In some conveyors, the pathway formed by the slot is curved. Accordingly, the conveyed bottles travel along this curved pathway. Because each bottle is suspended from its neck, its center of gravity is below the neck. As the bottle neck is conveyed along a curve, inertia tends to urge or hold the bottom of the bottle toward the convex side of the curve for a short period of time while the top portion of the bottle rides in the conveyor slot. This causes the bottle to appear to swing toward the convex side of the curve. This swinging may interfere with proper alignment of the bottle as it is conveyed to the destination work station and thereby cause the bottle to jam in the conveyor system or otherwise interfere with the proper operation of the conveyor system.

SUMMARY OF THE INVENTION

Among the several objects of the present invention may be noted the provision of an improved conveyor system which overcomes the disadvantages associated with the prior art conveyor systems; the provision of an improved method and apparatus for stabilizing an article, such as a bottle, conveyed in an air-type conveyor system; the provision of such a method and apparatus for maintaining proper orientation of the article as it is conveyed through the conveyor system; the provision of such a method and apparatus which minimizes swinging of the article as it is conveyed through a curve or turn in the conveyor system; and the provision of such apparatus of relatively simple construction.

In general, a method of the present invention is to stabilize an article conveyed in a conveyor system. An upper portion of the article is engaged by a guide mechanism for guiding the article along a conveyor pathway having a lateral curve or turn. The article is suspended from the guide mechanism as it is conveyed along the conveyor pathway. The method comprises directing a stream of air in a direction generally transversely to the conveyor pathway and generally adjacent the lateral curve so that the stream of air blows against a portion of the article when the article is moving along the lateral curve of the conveyor pathway. The air is directed in a manner to reduce lateral swinging of the article as the article is conveyed along the curved portion of the conveyor pathway.

In another aspect of the present invention, a conveyor system of the present invention is configured for conveying an article. The conveyor system comprises a guide mechanism configured for engaging an upper portion of the article in a manner so that the article is suspended from the guide mechanism. The guide mechanism is further configured for guiding the article in its suspended orientation along a conveyor pathway defined by the guide mechanism. The conveyor pathway includes a lateral curve or turn. The conveyor system further includes at least one air nozzle for connection to a source of pressurized air. The air nozzle is oriented for directing a stream of air in a direction generally adjacent the lateral curve and in a manner such that the stream of air blows against a lower portion of the article when the article is moving along the lateral curve of the conveyor pathway to counter inertial forces which tend to cause the article to deviate from the conveyor pathway.

Other objects and features will be in part apparent and in part pointed out hereinafter.

BRIEF DESCRIPTION OF THE DRAWINGS

FIG. 4 is a downwardly looking cross-sectional view taken along the plane of line 4—4 of FIG. 2;

FIG. 9 is an upwardly looking cross-sectional view taken along the plane of line 9—9 of FIG. 8, showing a lower plan view of the underside of the diverter section and of a feed section and output section of the conveyor system of FIG. 8;

FIG. 10 is a downwardly looking cross-sectional view taken along the plane of line 10—10 of FIG. 8;

Corresponding reference characters indicate corresponding parts throughout the several views of the drawings.

DESCRIPTION OF THE PREFERRED EMBODIMENTS

Figure 1:
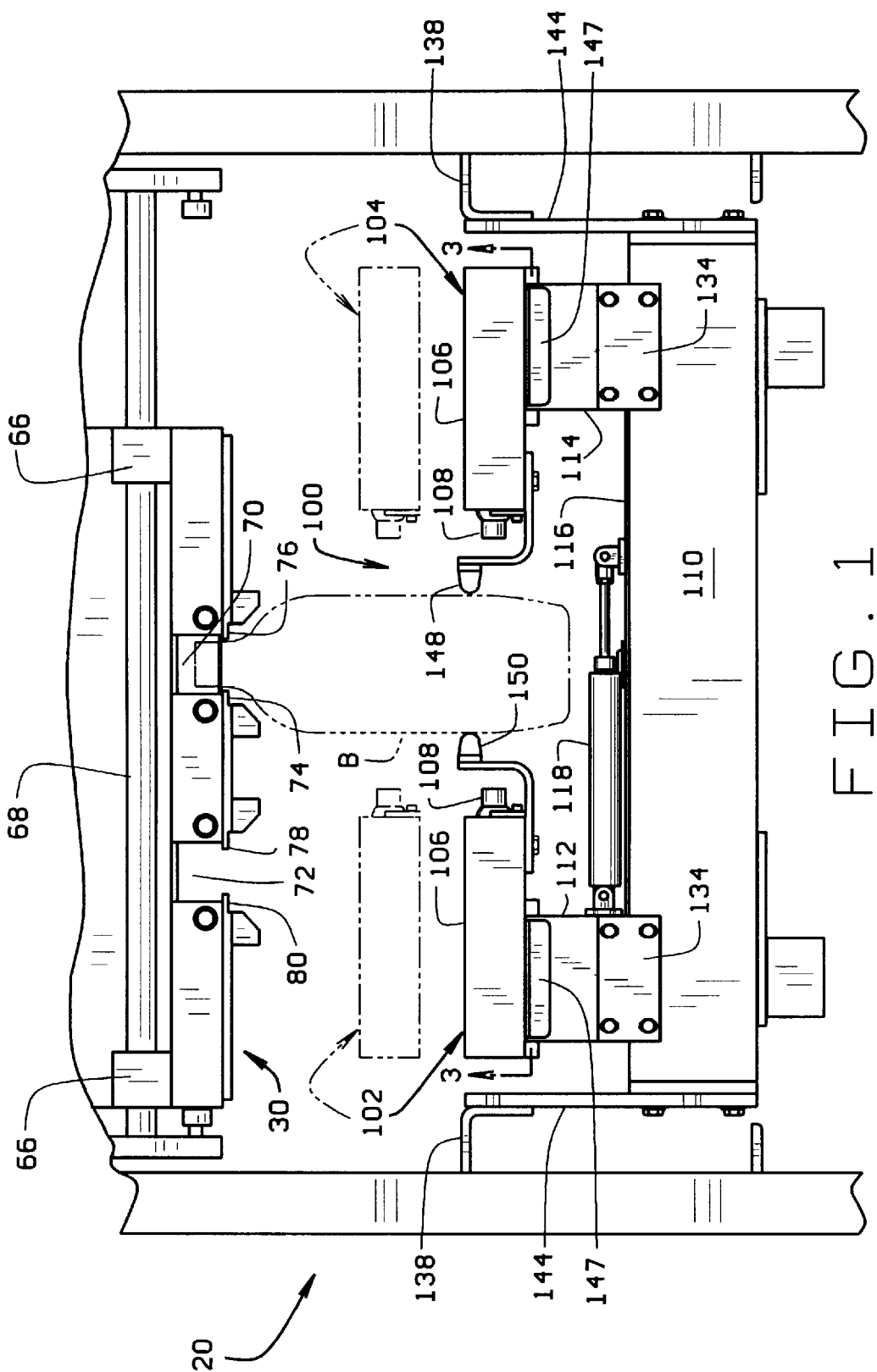
FIG. 1 is an end elevational downstream view of a two-path diverter section of a conveyor system of the present invention, the diverter section being oriented for directing bottles along a right turning path of the diverter section.
Figure 2:
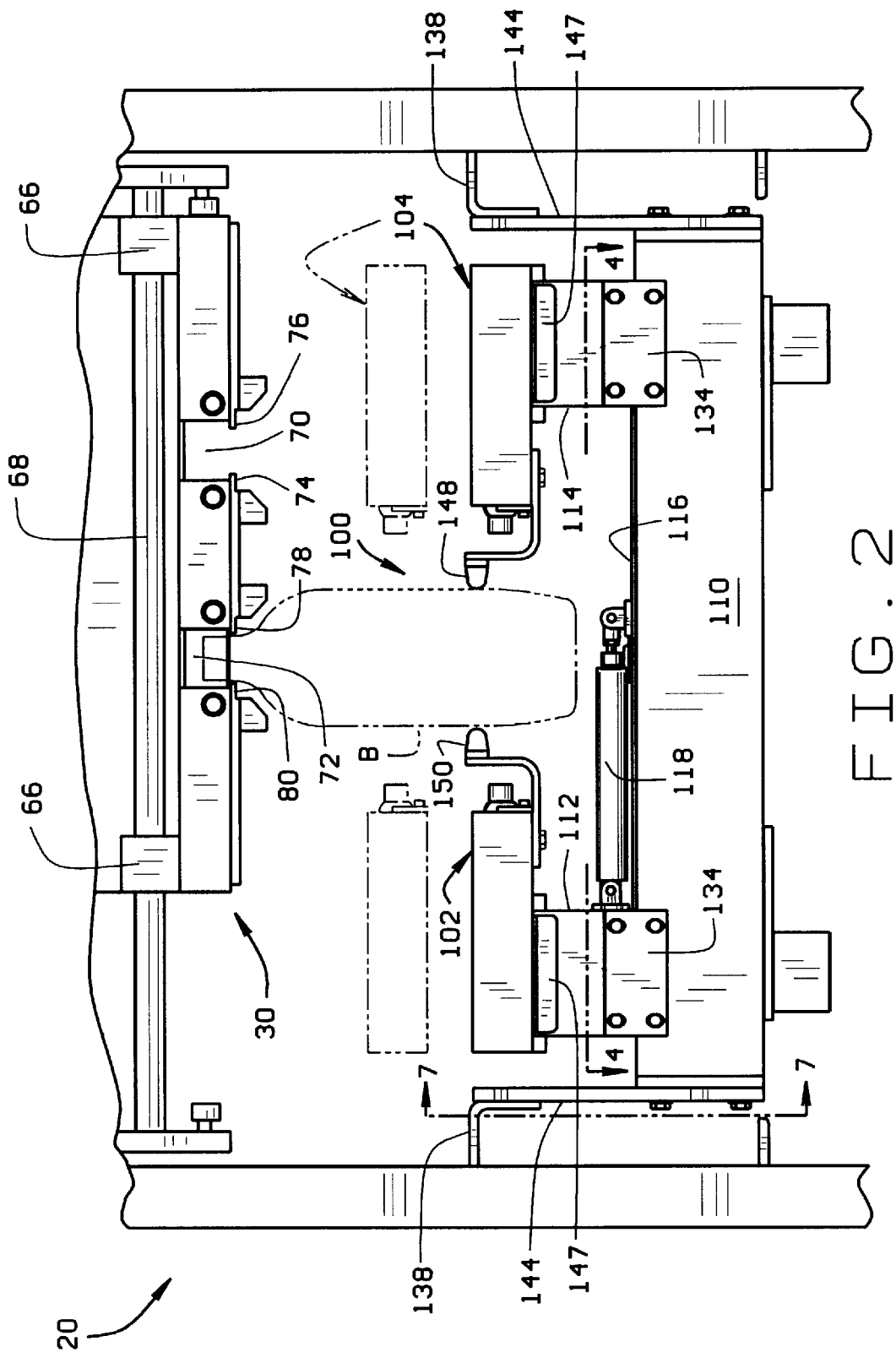
FIG. 2 is an end elevational downstream view similar to that of FIG. 1, but with the diverter section being oriented for directing bottles along a left turning path of the diverter section.
Figure 3:
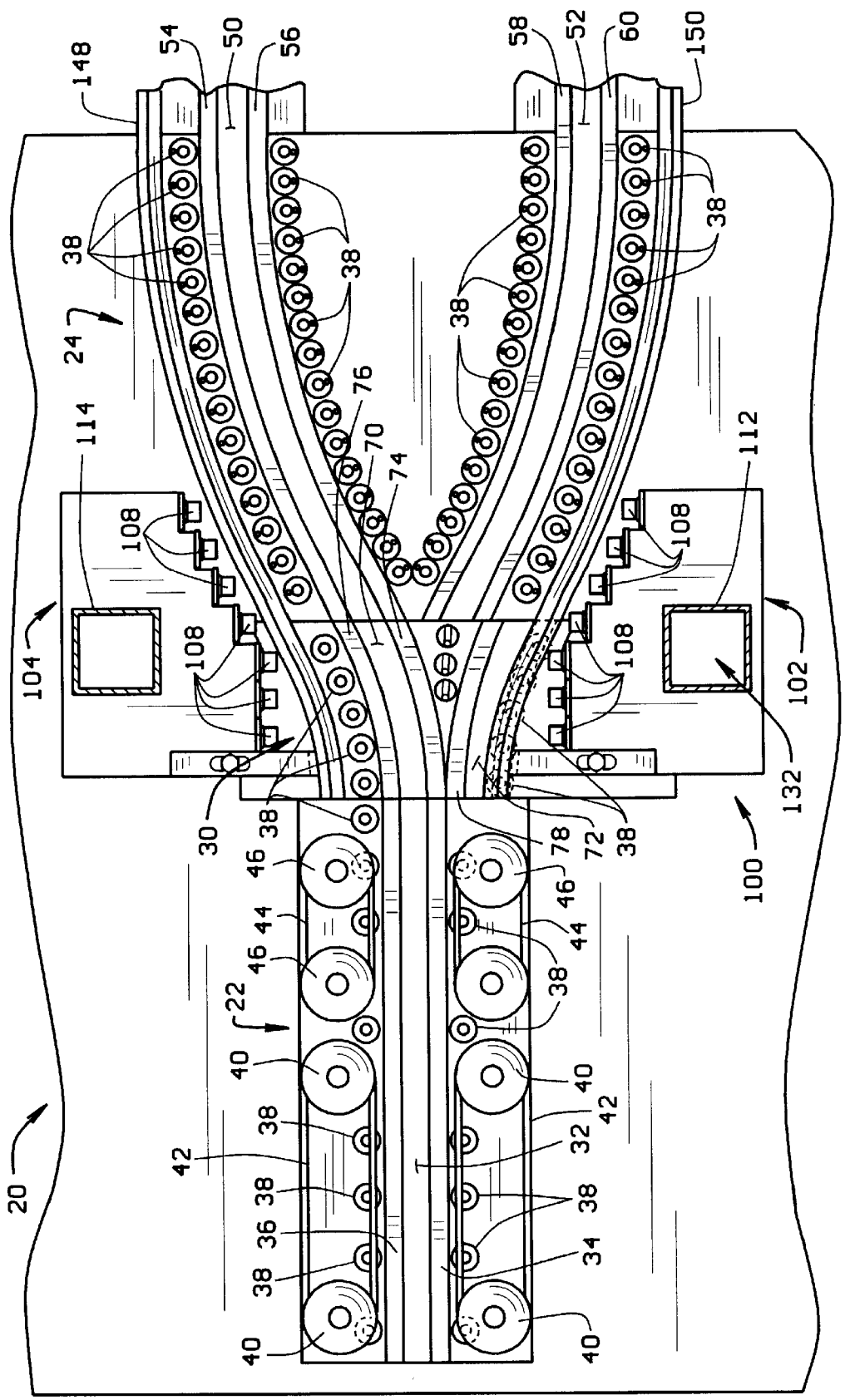
FIG. 3 is a cross-sectional view taken along the plane of line 3—3 of FIG. 1, showing an upwardly looking plan view of the underside of the diverter section and of a feed section and output section of the conveyor system of FIG. 1.

Referring now to the drawings, and first more particularly to FIGS. 1–3, a conveyor system of the present invention is indicated in its entirety by the reference numeral 20. The conveyor system 20 is preferably an air conveyor system of the type disclosed in U.S. Pat. No. 5,437,521 filed May 13, 1993, issued Aug. 1, 1995, and incorporated herein by reference. It includes a feed section, generally indicated at 22, an output section, generally indicated at 24, and a diverter section, generally indicated at 30. The diverter section 30 is shown schematically. A more detailed description of these sections is set forth in U.S. Pat. No. 5,611,647 incorporated herein by reference.

FIG. 3 shows the feed section 22, the diverter section 30, and the output section 24. Bottles B are conveyed from left to right in FIG. 3. The feed section 22 feeds the bottles to the diverter section 30, which selectively diverts the bottles to first and second pathways in the output section 24. The diverter section 30 and output section 24 both have air jet nozzle heads that eject jets of air to convey bottles (or other containers) through the sections. The supply of air is provided by a large blower (not shown) mounted above the sections. The construction of these air jet heads is similar to that disclosed in U.S. Pat. No. 5,611,647 referenced earlier.

The feed section 22 includes a slot 32 between opposed flanges 34, 36. The width of the slot 32 is sufficiently large to receive the neck of a bottle with the annular rib of the bottle supported on the top surfaces of the opposed flanges 34, 36 and the body of the bottle suspended below the flanges. The feed section 22 also comprises two separate pairs of belt and pulley assemblies. The first pair are spacing pulleys 40 and belts 42 at the upstream end of the feed slot 32. The pulleys 40 are driven by variable speed motors (not shown) that control and quickly change the speed of rotation of the pulleys as needed to produce a desired spacing between adjacent bottle containers conveyed through the feed slot 32 by holding back the stream of conveyed bottles. As the bottles are conveyed through the slot 32 and exit from between the spacing pulleys 40 and belts 42, they are next engaged by a pair of feed belts 44 and pulleys 46. This pair of belts 44 conveys the bottles through the remainder of the feed slot 32 and delivers them to the diverter section 30 of the conveyor system 20.

The output section 24 includes first and second output slots 50, 52. The first output slot 50 is formed by a pair of spaced, opposed flanges 54, 56, and the second output slot 52 is formed by another pair of spaced opposed flanges 58, 60. The two output slots 50, 52 lead from the diverter section 30 to output air conveyors (not shown). The slots 50, 52 are lined on opposite sides with a plurality of air jet heads 38. The air jet heads 38 are arranged and oriented so that air ejected from the heads conveys the bottles received from the diverter section 30 along the output slots 50, 52 to the output air conveyors.

Referring now to FIGS. 1 and 2, the diverter section 30 is slidably connected via bearing boxes 66 to lateral rails 68 (only one of which is shown in FIGS. 1 and 2). It is laterally moveable along the rails 68 via a pneumatic cylinder (not shown) between a first position (i.e., a leftmost position as shown in FIG. 1) and a second position (i.e., a rightmost position as shown in FIG. 2). The diverter section 30 further includes first and second diverter slots 70, 72. The first diverter slot 70 is defined by a first pair of opposed flanges 74, 76, and the second diverter slot 72 is defined by a second pair of opposed flanges 78, 80. Each diverter slot 70, 72 has an upstream end (i.e., the leftmost end as viewed in FIG. 3) and a downstream end (i.e., the rightmost end as viewed in FIG. 3). The slots 70, 72 are lined with a plurality of air jet heads 38 for conveying bottles from the upstream ends to the downstream ends. When the diverter section 30 is in its first position (FIGS. 1 and 3), then the upstream end of the first diverter slot 70 aligns with the feed slot 32 and the downstream end of the first diverter slot aligns with the upstream end of the first output slot 50. In this position, bottles are conveyed from the feed slot 32, through the first diverter slot 70, through the first output slot 50, and into the first output air conveyor, When the diverter section 30 is in its second position (FIG. 2), then the upstream end of the second diverter slot 72 aligns with the feed slot 32 and the downstream end of the second diverter slot aligns with the upstream end of the second output slot 52. In this position, bottles are conveyed from the feed slot 32, through the second diverter slot 72, through the second output slot 52, and into the second output air conveyor.

As a bottle is conveyed from the feed section 22 and into the diverter section 30, inertial forces tend to make the body of the bottle remain toward the center of the diverter section 30, the position it occupied as it initially entered the diverter section from the feed slot 32, even though the neck of the bottle is guided by and moves along a pathway formed by one of the curved diverter slots 70 or 72. To maintain the proper orientation of the bottle as it is conveyed through the diverter section, i.e., to keep the body of the bottle in a generally upright orientation substantially under the flanges of a corresponding diverter slot, the conveyor system is provided with a bottle stabilizing mechanism, generally indicated at 100 (FIGS. 1 and 2).

The bottle stabilizing mechanism 100 comprises first and second air discharging manifold assemblies 102, 104. Each manifold assembly includes a manifold chamber 106 and a plurality of air nozzles 108 connected to the manifold chamber for directing air generally transverse to the line of movement of the bottle (e.g., from left to right or from right to left as viewed in FIGS. 1 and 2). Preferably, the manifold assemblies 102, 104 are shaped so that an imaginary curve intersecting all of the ends of the nozzles generally follows the contour of the curve of the diverter slots. The manifold chambers 106 are in fluid communication with a supply air plenum 110 via first and second ducts 112, 114. A conventional compressor or blower (not shown) is in fluid communication with the supply air plenum 110 to provide a suitable source of pressurized air to the supply air plenum. Air flows from the air plenum, through the ducts, into the manifold chambers, and out the nozzles.

Air is blown through the nozzles 108 of the first manifold assembly 102 (the left manifold assembly as viewed in FIG. 1) to stabilize bottles conveyed along the first diverter slot (the right diverter slot as viewed in FIG. 1). In particular, air is blown through the first manifold assembly 102 from left to right against the body of the bottle to push the body of the bottle to the right to counter the inertia of the bottle's body which tends to keep the body of the bottle toward the center of the diverter section as the neck of the bottle is moved by the first diverter slot 70 to the right side of the diverter section as viewed in FIG. 1. Air is blown through the nozzles 108 of the second manifold assembly 104 (the right manifold assembly as viewed in FIG. 2) to stabilize bottles conveyed along the second diverter slot (the left diverter slot as viewed in FIG. 2). Preferably, air is blown through only one manifold assembly at a time. To accomplish this, a flow regulating plate 116 is positioned over a top surface of the air plenum 110. A first end (i.e., the left end as viewed in FIGS. 1 and 2) of the flow regulating plate 116 extends through a slot in the first duct 112, and a second end (i.e., the right end as viewed in FIGS. 1 and 2) of the plate extends through a slot in the second duct 114. The plate 116 is moveable from left to right as viewed in FIGS. 1, 2, and 4 to selectively block air flow through one of the first and second ducts 112, 114. A pneumatic cylinder 118 is connected at one end to the first duct 112 and is connected at an opposite end to the flow regulating plate 116 to move the flow regulating plate 116. Retraction of the piston rod of the pneumatic cylinder 118 moves the flow regulating plate 116 to the left as shown in FIGS. 2 and 4 to block flow through the first duct 112 and to open the second duct 114 to the plenum 110. Extension of the piston rod of the pneumatic cylinder 118 moves the flow regulating plate to the right as shown in FIG. 1 to block flow through the second duct 114 and to open the first duct 112 to the plenum 110. Thus, as viewed in FIG. 1, the flow regulating plate 116 is to be positioned to the right when the first diverter slot 70 is aligned with the feed slot 32, and is to be positioned to the left when the second diverter slot 72 is aligned with the feed slot.

Figure 5:
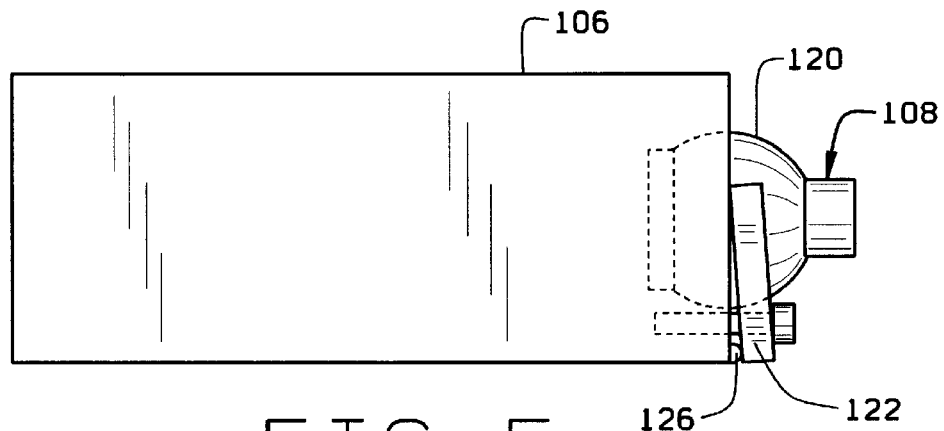
FIG. 5 is an enlarged side elevational view of an air discharging manifold assembly of the conveyor system of FIG. 1.
Figure 6:
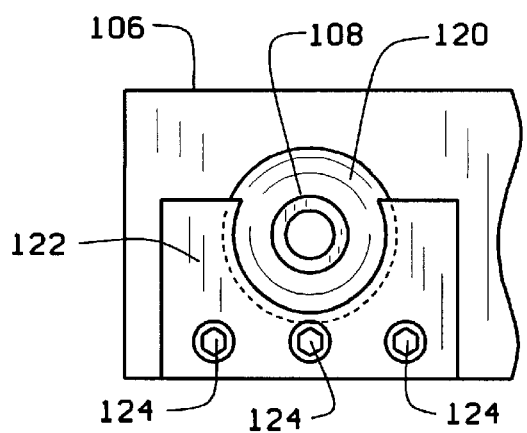
FIG. 6 is a fragmented front elevational view of the air discharging manifold assembly of FIG. 5.

Referring now to FIGS. 5 and 6, each air nozzle 108 has a ball-shaped body 120 configured for fitting within a socket formed in the manifold chamber 106. The nozzle body 120 is configured for pivotal movement within the socket to adjust the direction of air flow through the nozzle 108. Such adjustability is desirable to maximize the stabilizing effect of the air streams. A generally U-shaped plate 122 extends around a lower region of the ball-shaped body 120 and is connected to the manifold chamber 106 via suitable screws 124. Preferably, a small rib 126 is on the manifold chamber 106 and contacts a portion of the U-shaped plate 122 generally below the screw 124. Because of the rib 126, tightening of the screw 124 causes the U-shaped upper edge of the plate 122 to press against the ball shaped nozzle body 120 to thereby prevent movement of the nozzle 108 relative to the manifold chamber 106.

Figure 7:
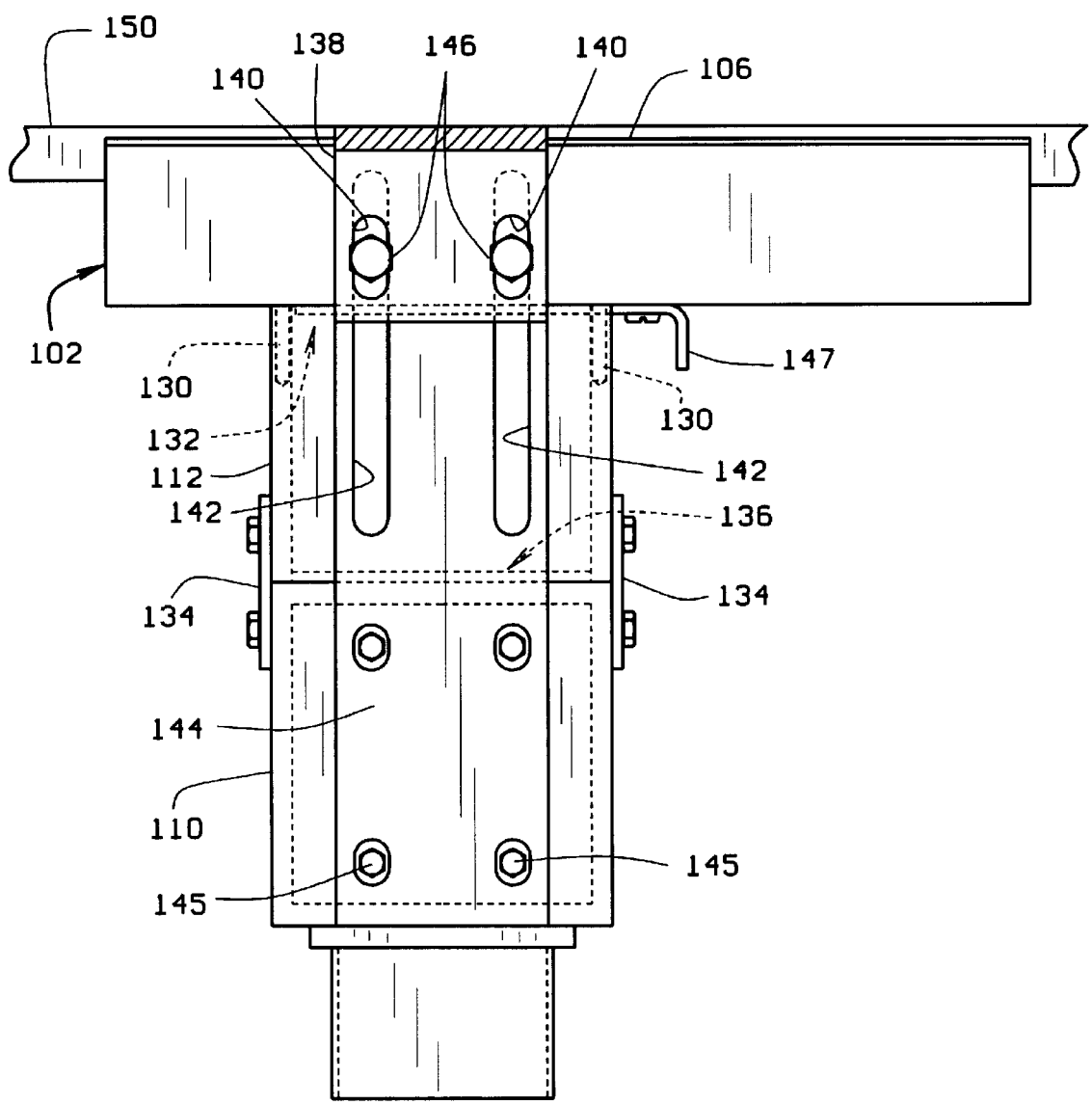
FIG. 7 is a cross-sectional elevation view taken along the plane of line 7—7 of FIG. 2.

A rear end elevational view of the first duct 112 is shown in FIG. 7. Although not shown, it is to be understood that a rear elevational view of the second duct 114 is a mirror image of the first duct and, therefore, a description of the first duct is equally applicable to the second duct. The first duct 112 is connected between the first discharging manifold assembly 102 and the air plenum 110. A top end of the first duct 112 is connected by a plurality of threaded fasteners 130 to an underside of the first discharging manifold assembly 102 around an opening 132 (see FIG. 3) provided in the bottom of the manifold assembly. The bottom end of the duct 112 is connected to the air plenum 110 by a pair of attachment plates 134 connected between the first duct 112 and the air plenum 110. The bottom end of the first duct 112 surrounds an opening 136 (see FIG. 4) provided in the top surface of the air plenum 110. With this arrangement, the first duct 112 provides a path of communication for air flow from the interior of the air plenum 110, through the first duct 112, and into the first discharging manifold assembly 112.

A pair of support arms 138 are provided on opposite sides of the air conveyor frame. The support arms 138 have a pair of elongated slots 140 therein. The support arm slots 140 are aligned with even longer slots 142 provided in a bracket 144 that is connected to an end of the air plenum 110 by threaded fasteners 145. Adjustable threaded fasteners 146 extend through the support arm slots 140 and the bracket slots 142 connecting the bracket to the support arm for adjustable vertical movement relative thereto. By loosening the threaded fasteners 146, the vertical position of the bracket 144 can be moved upwardly or downwardly relative to the support arm 138. With the bracket 144 suspending the air plenum 110, the first and second air ducts 112, 114, and the first and second discharging manifold assemblies 102, 104 from the support arms 138, adjusting the brackets 144 vertically relative to the support arms 138 simultaneously vertically adjusts the positions of the air plenum 110, the ducts 112, 114, and the manifolds 102, 104 relative to the conveyor apparatus 20 and the containers B being transported or conveyed by the apparatus. In FIGS. 1 and 2, the manifold assemblies 102, 104 are shown in phantom in their raised positions. Raising the manifold assemblies 102, 104 may be necessary to direct stabilizing air streams against shorter bottles (not shown). Small flow restricting plates 147 (FIG. 7) extend through slots in upper portions of the air ducts 112, 114 to control air flow through the ducts. Providing a plate 147 in each duct 112, 114 enables independent adjustment of air flow through each duct. For example, the flow restricting plate 147 in the first duct 112 may be moved to the right or to the left in FIG. 7 to vary the degree of flow restriction through the first duct 112. The similar flow restricting plate of the second duct 114 independently controls flow through the second duct.

The conveyor system 20 further includes first and second curved guide rails 148, 150. The first guide rail 148 is shaped and positioned for limiting outward movement (i.e., movement to the right as viewed in FIG. 1) of bottles conveyed along the first diverter slot 70. The second guide rail 150 is shaped and positioned for limiting outward movement (i.e., movement to the left as viewed in FIG. 2) of bottles conveyed along the second diverter slot 72. The first guide rail 148 is connected to the second manifold assembly 104 and is raised and lowered as the second manifold assembly is raised and lowered. The second guide rail 150 is connected to the first manifold assembly 102 and is raised and lowered as the second manifold assembly is raised and lowered. Of course, in vertically adjusting the manifolds for different size bottles, the manifolds must be positioned horizontally across from each other so both manifolds will always be vertically adjusted together.

The stabilizing mechanism 100 further includes a lower air nozzle 152 (FIG. 4) connected to the air plenum 110. The nozzle 152 is preferably positioned for directing a stream of air generally upwardly and rearwardly (i.e., upstream with respect to the bottle stream) to blow against the bottles in a manner to orient them so that the bottoms of the bottles slightly trail the necks of the bottles.

In operation, the diverter section 30 is positioned such that one of its diverter slots is aligned with the feed slot 32 and one of the output slots. For example, it may be positioned so that the first diverter slot 70 aligns with the feed slot 32 and with the first output slot 50. The first diverter slot 70 and first output slot 50 constitute a guide mechanism for guiding the bottles along a conveyor pathway having a lateral curve. With the diverter section 30 so positioned, the rod of the pneumatic cylinder 118 is extended so that pressurized air from the plenum 110 flows upward through the first duct 112, into the manifold chamber 106 of the first manifold assembly 102, and out the nozzles 108 in generally horizontal air streams to blow the bodies of the bottles to the right as viewed in FIG. 1 (and toward the top of the page as viewed in FIG. 3). Preferably, the nozzles of the first manifold 102 are positioned on the outside of the curve of the slot first diverter 70 (i.e., positioned on the convex side of the curve) to blow the bottle towards the concave side of the curve (or upwardly as viewed in FIG. 3). The nozzles 108 are preferably sized to provide a sufficient air velocity to push the bottles against the first guide rail 148 and thereby maintain the generally upright orientation of the bottles as they pas through the first diverter slot 70. In particular, the nozzles 108 preferably have nozzle openings with diameters between ¼" and ⅝". The position of each nozzle 108 may be independently adjusted (i.e., pivoted in its associated socket) to adjust the direction of the air stream flowing from the nozzle to thereby further reduce lateral swinging of the bottles as the bottles are conveyed along the first diverter slot 70 and an initial portion of the first output slot 50. Thus, lateral swinging of the bottles is minimized and the bottles are maintained in a suitable orientation.

Referring now to FIGS. 8–11, another conveyor system of the present invention is indicated in its entirety by the reference numeral 220. The conveyor system 220 is similar to the conveyor 20 of FIGS. 1–7 except the conveyor system 220 includes a three-way diverter instead of a two-way diverter. As shown in FIG. 9, the conveyor system 220 includes a feed section 222 identical to the feed section 22, an output section 224, and a diverter section 230.

The feed section 222 includes a slot 232 between opposed flanges. The feed section 222 of the embodiment shown in FIGS. 8–11 is the same as that of the FIGS. 1–7 embodiment.

The output section 224 includes first, second, and third output slots 250, 251, 252, each formed by a corresponding pair of spaced, opposed flanges. The output slots 250, 251, 252 lead from the diverter section 230 to output air conveyors (not shown). The second (or middle) output slot 251 is generally straight while the first and third output slots are curved. Although not shown, it is to be understood that the output slots 250, 251, 252 are lined on opposite sides with a plurality of air jet heads similar to those of the embodiment of FIG. 3. The air jet heads are not shown in order to simplify FIG. 9.

Figure 8:
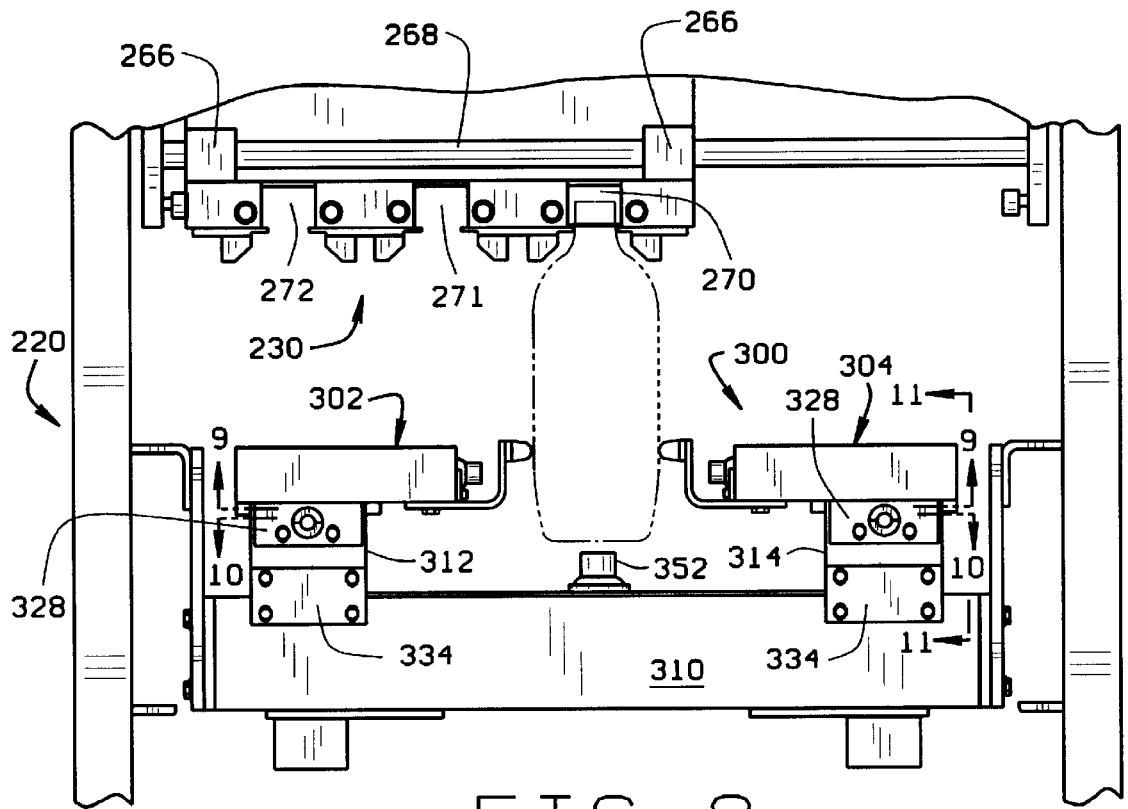
FIG. 8 is a downstream looking elevational view of a diverter section of a second embodiment of a conveyor system of the present invention, the diverter section being a three-path diverter section.

The diverter section 230 is slidably connected via bearing boxes 266 to lateral rails 268 (only one of which is shown in FIG. 8). The diverter section 230 further includes first, second, and third diverter slots 270, 271, 272, defined by opposing pairs of flanges. The diverter section 230 is laterally moveable along the rails 268 to any one of three positions in which one of the diverter slots aligns with the feed slot 232 and one of the output slots. Although not shown, it is to be understood that the diverter slots 270, 271, 272 are lined with air jet heads in a manner similar to that of the diverter 30. The air jet heads are not shown in order to simplify FIG. 9.

To maintain the proper orientation of the bottles as they are conveyed through the diverter section 230, i.e., to keep the bodies of the bottles substantially upright and under the flanges of a corresponding diverter slot, the conveyor system is provided with a bottle stabilizing mechanism, generally indicated at 300. The bottle stabilizing mechanism 300 is constructed similar to and operates in a manner similar to that of the bottle stabilizing mechanism 100. However, because the conveyor pathway is a generally straight line when the second (or middle) diverter slot 271 is aligned with the feed slot 232 and the second output slot 251, there is no need to operate the bottle stabilizing mechanism 300 in this mode of operation.

The bottle stabilizing mechanism 300 comprises first and second air discharging manifold assemblies 302, 304, an air plenum 310, and first and second ducts 312, 314 providing fluid communication between the air plenum and manifold assemblies. The manifold assemblies 302, 304 are identical to the manifold assemblies 102, 104 of the embodiment of FIGS. 1–7, and the air plenum 310 and ducts 312, 314 are identical to the air plenum 110 and ducts 112, 114. Thus, the description above with respect to the manifold assemblies 102, 104, the plenum 110, and the ducts 112, 114 is equally applicable to the manifold assemblies 302, 304, the plenum 310, and the ducts 312, 314. However, because no air is blown through the manifolds 302, 204 when bottles are conveyed through the second (or middle) diverter slot 271, both the first and second ducts 312, 314 must be closed at the same time. Therefore, the construction of the flow regulating plate 116 is not used in this embodiment.

Figure 11:
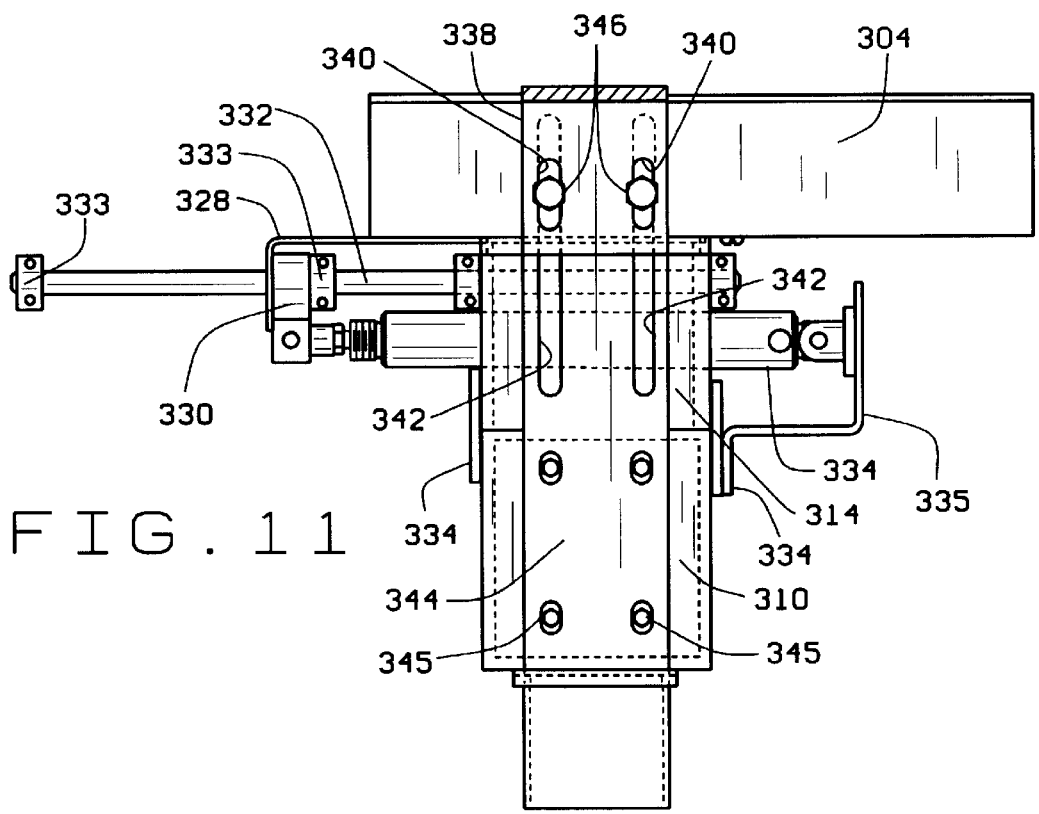
FIG. 11 is a cross-sectional elevation view taken along the plane of line 11—11 of FIG. 8.

Air is blown through the nozzles of the first manifold assembly 302 (the left manifold assembly as viewed in FIG. 8) to stabilize bottles conveyed along the first diverter slot 270 (the right diverter slot as viewed in FIG. 8). In particular, air is blown through the first manifold assembly 302 from left to right against the body of the bottle to push the body of the bottle to the right which tends to keep the bottle in a generally upright orientation as it moves through the first diverter slot 270 just as was done in the first embodiment. Air is blown through the nozzles of the second manifold assembly 304 (the right manifold assembly as viewed in FIG. 8) to stabilize bottles conveyed along the third diverter slot (the left diverter slot as viewed in FIG. 8). Preferably, air is blown through only one manifold assembly at a time, and is not blown at all when the bottles are conveyed through the second (middle) diverter slot 271. To accomplish this, each duct 312, 314 is provided with its own flow restricting plate 328 (FIGS. 10 and 11). A first end of the flow restricting plate 328 extends through a slot in its corresponding duct, and an opposite second end is secured to a bearing 330 journaled to a guide rod 332. Each flow restricting plate moves with its corresponding bearing 330 along the guide rod 332 between covering and uncovering positions. The extent of restricting plate movement is controlled by adjustably positioning a pair of stops 333 at opposite sides of the journal 330 on the guide rod 332. As shown in FIG. 10, the flow restricting plate 328 on the left is shown in its covering position and the flow restricting plate 328 on the right is shown in its uncovering position. The flow restricting plate 328 is moved between its covering and uncovering positions via a pneumatic cylinder 334 having its cylinder fixed to the duct by a suitable bracket 335 and its rod connected to the bearing 330. Extension of the rod of the pneumatic cylinder 334 moves the plate 328 to its uncovering position, and retraction of the rod moves the plate to its covering position. When a flow restricting plate 328 is in its covering position, it blocks flow through its associated duct and thereby prevents flow through its manifold assembly. When a flow restricting plate 328 is in its uncovering position, it allows air to flow from the plenum 310 and through the manifold assembly. When the bottles are being conveyed along the first diverter slot 270, the flow restricting plate 328 of the first duct 312 is in its uncovering position and the flow restricting plate of the second duct 314 is in its covering position. When the bottles are being conveyed along the third diverter slot 272, the flow restricting plate 328 of the second duct 314 is in its uncovering position and the flow restricting plate of the first duct 312 is in its covering position. When the bottles are being conveyed along the second (or middle) diverter slot 271, the flow restricting plates 328 of both the first and second ducts 312, 314 are in their covering positions to prevent air to flow to either manifold assembly.

Although not described in detail, it is to be understood that the first and second manifold assemblies 302, 304 are raised and lowered in the same manner as the manifold assemblies 102, 104 of the embodiment of FIGS. 1–7. The stabilizing mechanism 300 also includes a lower air nozzle 352 identical to and providing the same function as the lower air nozzle 152 of FIG. 4. The stabilizing mechanism 300 also includes support arms 338, support arm slots 340, brackets slots 342, brackets 344, and fasteners 345. The numbering of the component parts of bracket assembly 344 employed in raising and lowering the manifolds 302, 304 are the same as those used in describing the bracket assembly 144 of the embodiment of FIGS. 1–7 increased by 200.

Figure 12:
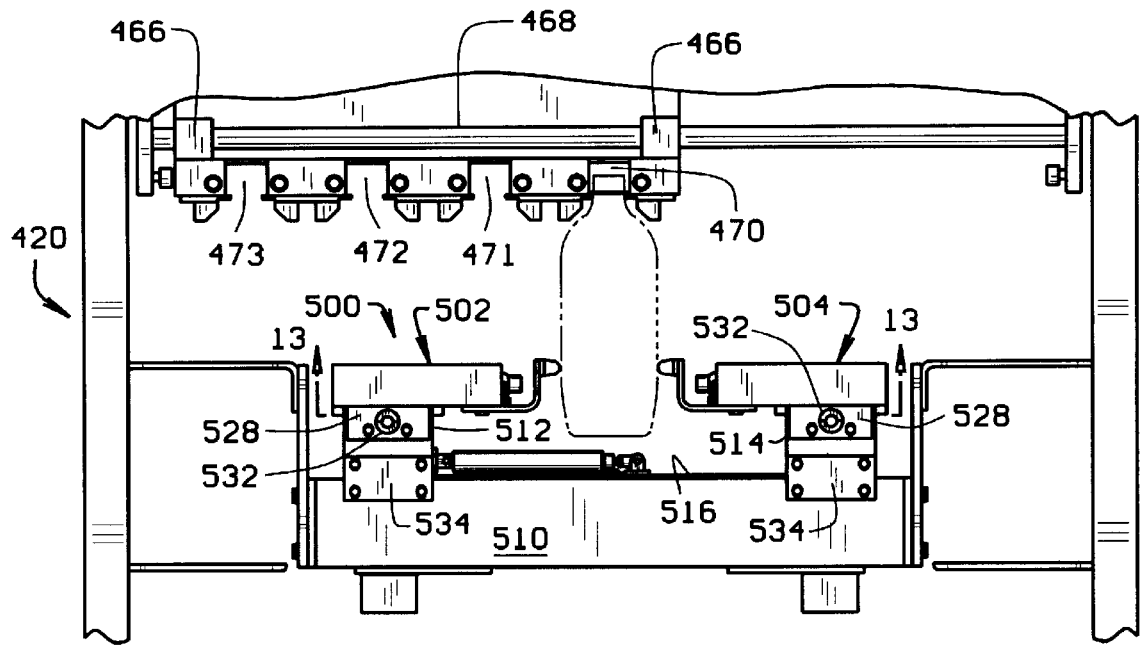
FIG. 12 is a downstream looking elevational view of a diverter section of a third embodiment of a conveyor system of the present invention, the diverter section being a four-path diverter section.
Figure 13:
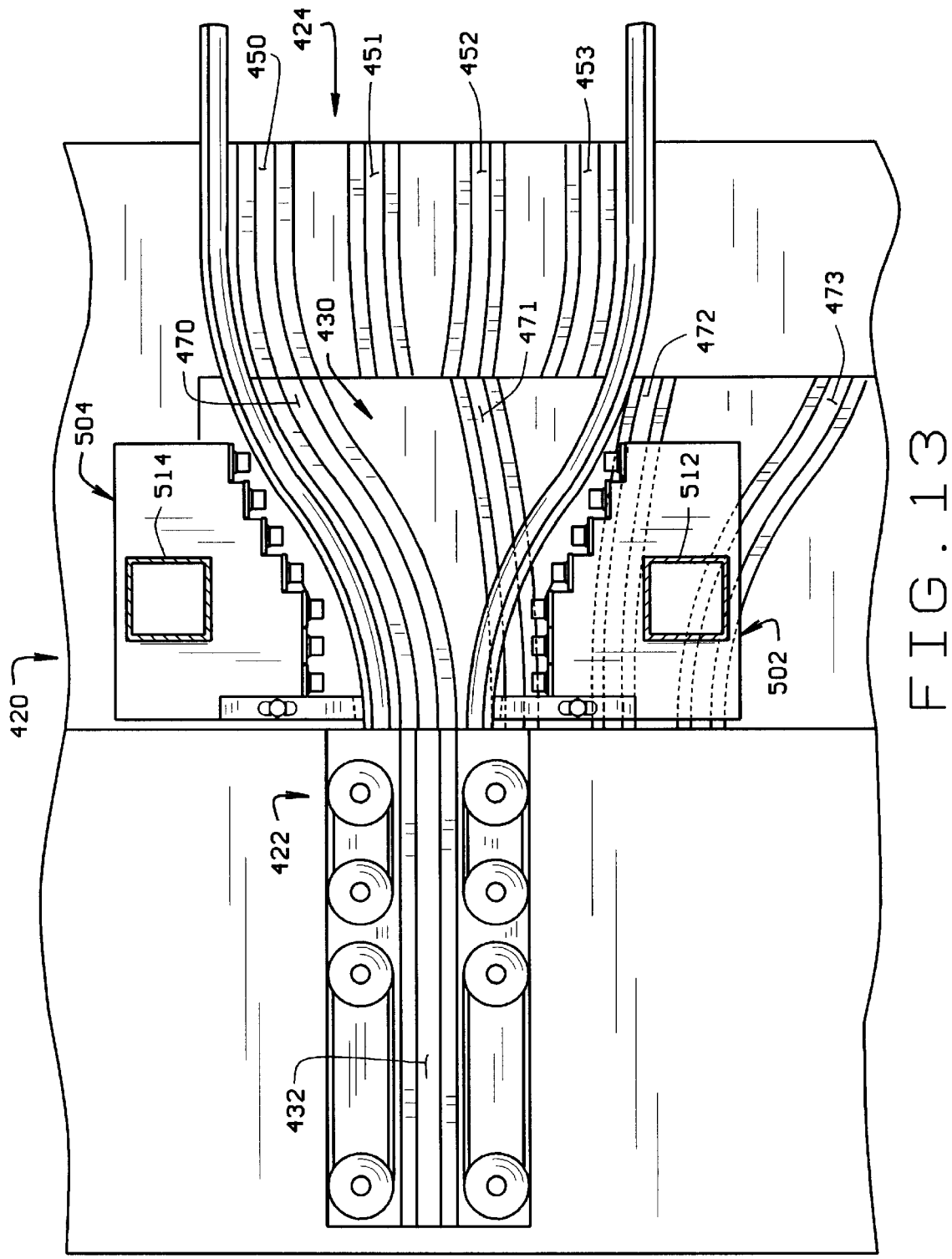
FIG. 13 is an upwardly looking cross-sectional view taken along the plane of line 13—13 of FIG. 12, showing a plan view of the underside of the diverter section and of a feed section and output section of the conveyor system of FIG. 12.

Referring now to FIGS. 12 and 13, another conveyor system of the present invention is indicated in its entirety by the reference numeral 420. The conveyor system 420 is similar to the conveyor system 20 of FIGS. 1–7 except the conveyor system 420 includes a four-way diverter instead of a two-way diverter. As shown in FIG. 13, the conveyor system 420 includes a feed section 422, an output section 424, and a diverter section 430.

The feed section 422 is identical to the feed section 22 and includes a feed slot 432 between opposed flanges. The output section 424 is similar to the output section 24 of the first embodiment but includes first, second, third, and fourth output slots 450, 451, 452, 453 each formed by a corresponding pair of spaced, opposed flanges. The output slots 450, 451, 452, 453 lead from the diverter section 430 to output air conveyors (not shown). Although not shown, it is to be understood that the output slots 450–453 are lined on opposite sides with a plurality of air jet heads similar to those of the embodiment of FIG. 3.

The diverter section 430 is slidably connected via bearing boxes 466 to lateral rails 468 (only one of which is shown in FIG. 12). The diverter section 430 further includes first, second, third, and fourth diverter slots 470, 471, 472, 473 defined by opposing pairs of flanges. The diverter section 430 is laterally moveable along the rails 468 to any one of four positions in which one of the diverter slots aligns with the feed slot 432 and one of the output slots. Although not shown, it is to be understood that the diverter slots 470–473 are lined with air jet heads in a manner similar to that of the diverter 30 of FIG. 3.

The conveyor system 420 includes a bottle stabilizing mechanism, generally indicated at 500. The bottle stabilizing mechanism 500 operates in a manner similar to that of the bottle stabilizing mechanisms 100, 300 of the two previously described embodiments. However, because the curvature of the first and fourth diverter slots 470, 473 is greater than that of the second and third diverter slots 471, 472, a greater force of air is needed to stabilize bottles conveyed through the first and fourth slots than that necessary to stabilize bottles conveyed through the second and third slots.

The bottle stabilizing mechanism 500 comprises first and second air discharging manifold assemblies 502, 504, an air plenum 510, and first and second ducts 512, 514 providing fluid communication between the air plenum and manifold assemblies. The manifold assemblies 502, 504 are identical to the manifold assemblies 102, 104 of the first embodiment, and the air plenum 510 is identical to the air plenum 110 of the first embodiment. However, because there are four output slots with one pair of the output slots 452, 453 positioned to the left of the infeed slot 432, and with the second pair of output slots 450, 451 positioned to the right of the infeed slot 432, the construction of the first and second air ducts 512, 514 leading from the air plenum 510 to the manifolds 502, 504 is a combination of the constructions of the air ducts 112, 114 of the first described embodiment and the air ducts 312, 314 of the second described embodiment.

Air is blown through the nozzles of the first manifold assembly 502 (the left manifold assembly as viewed in FIG. 12) to stabilize bottles conveyed along either one of the first and second diverter slots 470, 471 (the right two diverter slots as viewed in FIG. 12). Air is blown through the nozzles of the second manifold assembly 504 (the right manifold assembly as viewed in FIG. 12) to stabilize bottles conveyed along the third and fourth diverter slots 472, 473 (the left two diverter slots as viewed in FIG. 12).

The bottle stabilizing mechanism includes a flow regulating plate 516 and two flow restricting plates 528 to provide the desired amount of air flow through the manifold assemblies 502, 504. The flow regulating plate 516 is identical to and operates in the same manner as the flow regulating plate 116 of the first embodiment to selectively block air flow through the first air duct 512 while opening the second air duct 514 to air flow, or to block air flow through the second air duct 514 while opening the first air duct 512 to air flow.

Each flow restricting plate 528 is identical to the flow restricting plate 328 of the second embodiment and is operated in a similar manner. However, instead of being moveable between a fully covering position and an uncovering position, each flow restricting plate 528 is moveable between a partial covering position and an uncovering position. Air flows up through the air duct opened by operation of the flow regulating plate 516 in either position of the flow restricting plate 528. However, air flows through the duct at a faster rate when the flow restricting plate is in its uncovering position than when it is in its partial covering position. Each flow restricting plate 528 is moveable between its uncovering position and its partial covering position via a pneumatic cylinder 534 similar to the pneumatic cylinder 334 of the second embodiment. To prevent the restricting plate 528 from moving to a fully covering position upon retraction of the cylinder rod, a stop on the guide rod 532 that corresponds to the right-hand stop 333 shown in FIG. 11 is adjusted to the desired extent to the left as shown in FIG. 11, thereby preventing the restricting plate 528 from fully closing. Preferably, the position of the stop is adjustable to adjust the extent to which the restricting plate 528 restricts air flow. Each of the flow restricting plates 528 on the opposite sides of the stabilizing mechanism is positioned in its uncovering position when the bottles are conveyed along the first or fourth (outer two) diverter slots 470, 473, because more air flow through the particular manifold assembly 502, 504 is needed under these circumstances. The flow restricting plate 528 is positioned in its partially covering position when the bottles are conveyed along the second or third (middle two) diverter slots 471, 472, because less air flow through the manifold assemblies 502, 504 is needed under these circumstances. It is also important to have the reduced air flow when bottles are conveyed along one of the middle two diverter slots because the guide rails are positioned too far away from these slots to limit outward swinging of bottles. Thus, the air flow needs to be sufficient to move the bodies of the bottles under the second or third diverter slots, but not so great that the bottles swing significantly outward beyond these slots.

Although not described in detail, it is to be understood that the first and second manifold assemblies 502, 504 are raised and lowered in the same manner as the manifold assemblies of the previously described embodiments. The stabilizing mechanism 500 also includes a lower air nozzle identical to and providing the same function as the lower air nozzle 152 of FIG. 4.

Figure 14:
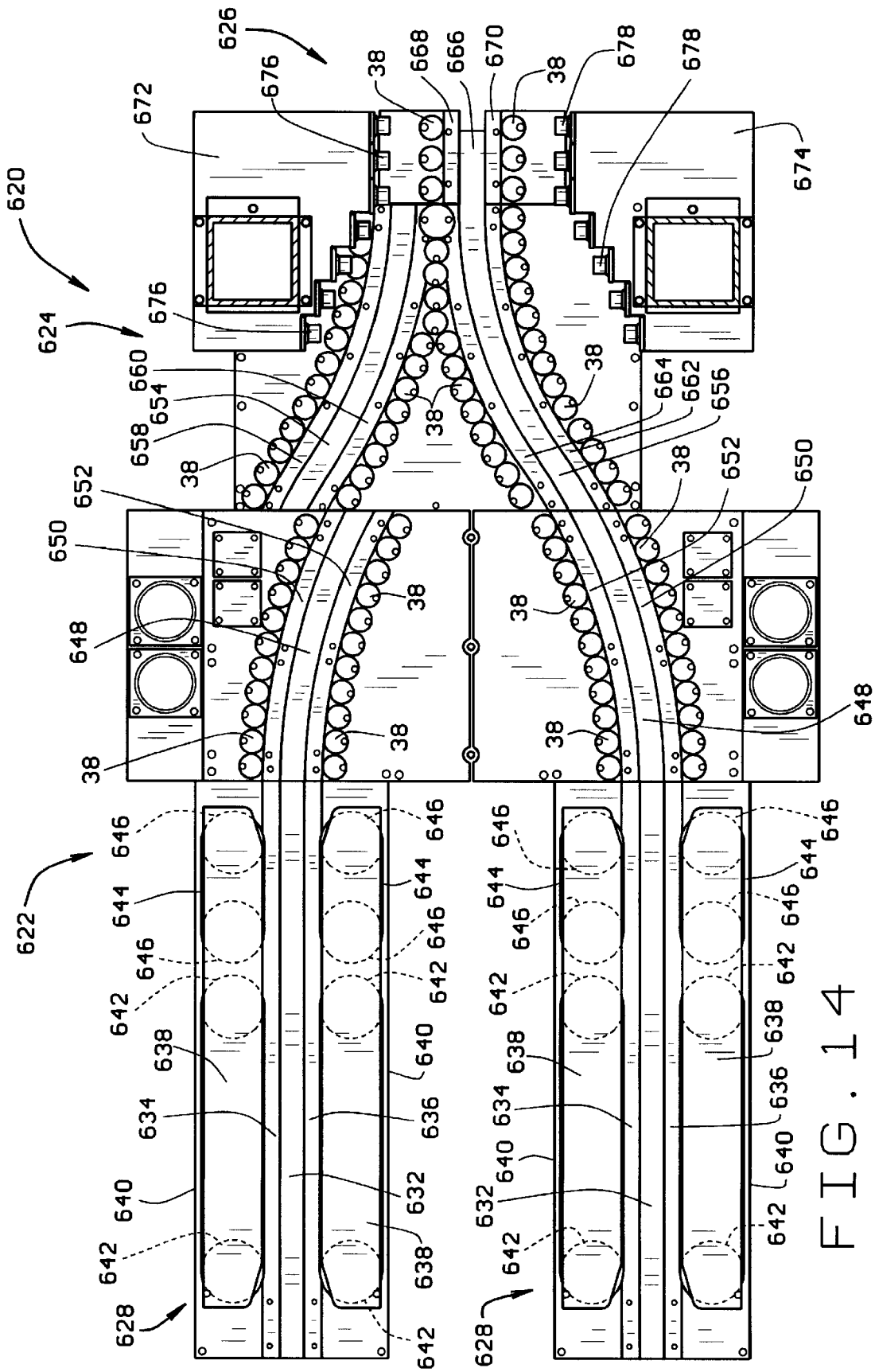
FIG. 14 is an upwardly looking plan view of the underside of a fourth embodiment of a conveyor system of the present invention, the conveyor system including a two-path combiner.

FIG. 14 shows another conveyor system of the present invention that is very similar to the conveyor system shown in FIGS. 1–7 except that the conveyor system in FIG. 14 instead of dividing a single infeed flow of bottles into a pair of output flows of bottles, the conveyor system of FIG. 14 combines a pair of infeed flows of bottles into a single output flow of bottles. The flow of bottles progresses from left to right as viewed in FIG. 14. The conveyor system 620 is comprised of a feed section 622, a combiner section 624, and an output section 626.

The feed section 622 is comprised of two substantially identical feed assemblies 628, each of which are also substantially identical to the feed assembly of the first described embodiment shown in FIG. 3. As in the first described embodiment, each feed assembly 628 includes an infeed slot 632 between a pair of opposed flanges 634, 636. The width of the slot 632 is sufficiently large to receive the neck of a bottle therein with the annular rib around the bottle neck supported on the top surfaces of the opposed flanges, 634, 636 and the body of the bottle suspended below the flanges. Each feed assembly 628 also includes two separate pairs of belt and pulley assemblies. Although the belt and pulley assemblies of each feed assembly are shown covered by their cover plates 638 in FIG. 14, they are substantially identical to the belt and pulley assemblies of the FIG. 3 embodiment of the invention. The first set of belt and pulley assemblies are spacing belts 640 and pulleys 642 positioned at the upstream ends of each of the feed slots 632. The pulleys 642 are driven by variable speed motors (not shown) that control and quickly change the speed of rotation of the pulleys as needed to produce a desired spacing between adjacent bottle containers conveyed through each of the feed slots 632, by holding back the stream of conveyed bottles and periodically conveying them to the second belt and pulley assemblies comprised of the feed belts 644 and pulleys 646. As the bottle containers are conveyed through the infeed slots 632 and exit from between the spacing pulleys 642 and spacing belts 640, they are next engaged by the feed belts 644 and the feed pulleys 646. The feed belts and pulleys convey the bottles through the remainder of the feed slots 632 and deliver them to one of two converging slots 648 that are positioned downstream from each of the belt and pulley feed assemblies 628.

The feed and spacing belt and pulley assemblies in FIG. 14 operate in the same manner as that of the FIG. 3 embodiment of the invention. However, it should be understood that only one of the infeed slot 632 feed and spacing pulley assemblies will operate at a time to deliver a stream of spaced bottle containers to its downstream converging slot 648 while the other infeed slot belt and pulley assemblies hold back a stream of bottles from its associated converging slot 648. For example, as shown in FIG. 14, only the feed and spacing pulley assemblies of the lower infeed slot 632 as viewed in FIG. 14 will provide a stream of spaced bottles to its downstream converging slot 648 while the spacing and feed belt and pulley assemblies of the upper feed slot 632 shown in FIG. 14 will not be operating and will be holding back a stream of bottles from its downstream converging slot 648.

Each of the converging slots 648 is constructed in substantially the same manner as the output slots 50, 52 of the first described embodiment of the invention. Each converging slot 648 includes a pair of spaced, opposed flanges 650, 652 that are lined by air jet heads 38 identical to the air jet heads of the first described embodiment. The air jet heads 38 are positioned or oriented along the opposite flanges 650, 652 of each of the converging slots 648 so that air ejected from the heads conveys the bottles received from the infeed slot 632 along the particular converging slot 648 toward the combiner section 624 of the conveyor system. Again, only one of the converging slots 648 will convey a stream of spaced bottle containers at a time toward the combiner section 624 due to the alternate operation of the spacing and feed belt and pulley assemblies of the infeed slots 632.

The combiner section 624 is constructed very similar to and operates very similar to the diverter section 30 of the first described embodiment. Like the diverter section, it is slidably connected via bearing boxes (not shown) to lateral rails (not shown). It is moved laterally along the rails by a pneumatic cylinder assembly (not shown) between a first position or a rightmost position as shown in FIG. 14 and a second position or a leftmost position relative to the output section 626. The combiner section 624 is comprised of a first slot 654 and a second slot 656. The first slot 654 has a first pair of opposed flanges 658, 660 and the second slot 606 has a second pair of opposed flanges 662, 664. Each of the first and second slots 654, 656 are aligned with air jet nozzles 38 along their flanges. As in the diverter of the first embodiment, the air jet nozzles 38 convey bottle containers along the slots 654, 656 in a downstream direction toward the output section 626 of the conveyor system.

When the combiner section 624 is in its first position shown in FIG. 14, the second slot 656 receives a flow of bottle containers conveyed through the converging slot 648 that communicates with the feed assembly 628 shown at the bottom of FIG. 14. In this position of the combiner section 624, bottles are conveyed through the second slot 656 to the output slot 666 of the output section 626. The output slot 666 is comprised of a pair of flanges 668, 670 in the same manner as other conveying slots of other embodiments of the invention. These opposed flanges are also lined with air jet heads 38 that are positioned to convey bottle containers received from the combiner section 624 downstream from the combiner section or to the right as viewed in FIG. 14. When the combiner section 624 is moved to its second position, it conveys bottles received from the converging slot 648 and the infeed slot 632 shown at the top of FIG. 14 to the output slot 666.

As in the previously described embodiments, as the bottles are conveyed through one of the first and second combiner slots 654, 656, the necks of the bottles supported in the slots move toward the center of the combiner faster than the bodies of the bottles suspended beneath the slots. This produces an undesirable orientation of the bottles conveyed through the combiner slots where the bottoms of the bottles are angled outwardly away from the center of the combiner. As explained earlier, it is more desirable to have the bottle containers remain in a substantially upright orientation as they are conveyed through the combiner slots to avoid jamming. To obtain the desirable generally upright orientation of the bottles conveyed through the combiner slots, a stabilizing mechanism similar to that of previous embodiments is employed.

The stabilizing mechanism comprises first and second air discharging manifold assemblies 672, 674. Each manifold assembly is substantially identical to that of previously described embodiments. Each manifold assembly includes a manifold chamber and a plurality of air nozzles 676, 678 that communicate with their respective manifold chamber for directing air generally transverse to the line of movement of the bottles. As in the previously described embodiment, the nozzles are positioned in each of the manifold assemblies 672, 674 so that they generally follow the curvature of the combiner slot 654, 656 closest to the manifold assembly. Air is selectively supplied to only one of the manifold assemblies at a time just as in the first described embodiment of FIGS. 1–7.

In the position of the combiner 624 shown in FIG. 14 with the second combiner slot 656 communicating the lower feed assembly 628 with the output slot 666, air is blown from the nozzles 678 of the second manifold assembly 674 to stabilize the bottles and move them to a generally upright orientation as they are conveyed through the second combiner slot 666. When the combiner section 624 is moved downwardly as shown in FIG. 14 so that the first combiner slot 654 communicates the upper feed assembly 628 shown in FIG. 14 with the output slot 666, air is blown through the nozzles 676 of the first manifold assembly 672 to stabilize the bottles and move them to a generally upright orientation as they are conveyed through the first combiner slot 654.

Although the combiner conveyor system 620 described above and shown in FIG. 14 combines only two infeed conveyors with a single output conveyor, it should be appreciated that the system could be modified in a manner similar to that of the diverter conveyor system described earlier to combine more than two infeed conveyors, for example three or four infeed conveyors, with a single output conveyor.

While the present invention has been described by reference to a specific embodiment, it should be understood that modifications and variations of the invention may be constructed without departing from the scope of the invention defined in the following claims.

What is claimed is:

1. A method of stabilizing an article conveyed in a conveyor system in which an upper portion of the article is engaged by a guide mechanism for guiding the article along a conveyor pathway having a lateral curve, the article being suspended from the guide mechanism as it is conveyed along the conveyor pathway, the method comprising:

directing a stream of air generally adjacent the lateral curve so that the stream of air blows against a portion of the article when the article is moving along the lateral curve of the conveyor pathway, the air being directed in a manner to reduce lateral swinging of the article as the article is conveyed along the lateral curve of the conveyor pathway.

2. A method as set forth in claim 1 wherein the step of directing the stream of air generally adjacent the lateral curve comprises directing a horizontal stream of air generally transversely to the conveyor pathway.

3. A method as set forth in claim 1 wherein the directing comprises directing the stream of air generally from an outside region of the lateral curve of the conveyor pathway to an inside region of the lateral curve.

4. A method as set forth in claim 1 wherein the step of directing the stream of air generally adjacent the lateral curve comprises directing a plurality of streams of air generally transversely to the conveyor pathway.

5. A method as set forth in claim 4 further comprising a step of independently adjusting a direction of each stream of air in a manner to further reduce lateral swinging of the article as the article is conveyed along the lateral curve of the conveyor pathway.

6. A method as set forth in claim 4 further comprising the step of simultaneously adjusting the velocity of all streams of air in a manner to further reduce lateral swinging of the article as the article is conveyed along the lateral curve of the conveyor pathway.

7. A method as set forth in claim 1 wherein the article comprises a container and wherein the step of directing the stream of air adjacent the lateral curve comprises directing the stream of air in a manner so that the stream of air blows against a portion of the container when the container is moving along the lateral curve of the conveyor pathway.

8. A method of stabilizing an article conveyed in a conveyor system in which an upper portion of the article is engaged by a guide mechanism for guiding the article along a conveyor pathway having a lateral curve, the article being suspended from the guide mechanism as it is conveyed along the conveyor pathway, the method comprising:

directing a stream of air in a direction generally adjacent the lateral curve and in a manner such that the stream of air blows against a lower portion of the article which is below the upper portion of the article when the article is moving along the lateral curve of the conveyor pathway to counter inertial forces which tend to cause the article to deviate from the conveyor pathway.

9. A conveyor system for conveying an article having an upper portion and a lower portion below the upper portion, the conveyor system comprising:

a guide mechanism configured for engaging the upper portion of the article in a manner so that the article is suspended from the guide mechanism, the guide mechanism further being configured for guiding the article in a suspended orientation thereof along a conveyor pathway defined by the guide mechanism, the conveyor pathway having a lateral curve; and at least one air nozzle for connection to a source of pressurized air, said air nozzle being oriented for directing a stream of air in a direction generally adjacent the lateral curve and in a manner such that the stream of air blows against the lower portion of the article when the article is moving along the lateral curve of the conveyor pathway to counter inertial forces which tend to cause the article to deviate from the conveyor pathway.

10. A conveyor system as set forth in claim 9 wherein said at least one air nozzle is positioned generally below the guide mechanism.

11. A conveyor system as set forth in claim 10 wherein said at least one air nozzle is positioned and configured for directing a generally horizontal stream of air generally transversely to the conveyor pathway.

12. A conveyor system as set forth in claim 9 wherein the nozzle is located generally laterally outside the curve of the conveyor pathway and is oriented for directing a stream of air generally from an outside region of the curve of the conveyor pathway to an inside region of the curve.

13. A conveyor system as set forth in claim 9 wherein said at least one air nozzle comprises a plurality of air nozzles oriented for directing streams of air generally adjacent the lateral curve and in a manner such that the streams of air blow against the lower portion of the article when the article is moving along the lateral curve of the conveyor pathway to counter inertial forces which tend to cause the article to deviate from the conveyor pathway.

14. A conveyor system as set forth in claim 13 wherein said plurality of air nozzles are independently pivotally adjustable relative to the conveyor pathway for facilitating adjustment of a direction of each stream of air.

15. A conveyor system as set forth in claim 14 further comprising a flow restrictor for simultaneously adjusting a flow velocity through the air nozzles.

16. A conveyor system as set forth in claim 9 wherein the guide mechanism comprises a track having a pair of spaced, parallel, upwardly facing guide surfaces configured for receiving and engaging outwardly extending flange portions of the article, the guide surfaces being configured for slidably supporting the article via the article's outwardly extending flange portions as the article is conveyed along the conveyor pathway.

17. A conveyor system as set forth in claim 16 wherein said at least one air nozzle is positioned generally below the track of the guide mechanism.

18. A conveyor system as set forth in claim 9 further comprising a plurality of article conveying nozzles, said article conveying nozzles being oriented relative to the guide mechanism so that air streams flowing through the article conveying nozzles flow in a manner to urge the article along the conveyor pathway.

19. A conveyor system as set forth in claim 9 wherein said at least one air nozzle is one of a plurality of air nozzles oriented for directing streams of air generally adjacent the lateral curve and in a manner such that the streams of air blow against the lower portion of the article when the article is moving along the lateral curve of the conveyor pathway to counter inertial forces which tend to cause the article to deviate from the conveyor pathway.

20. A conveyor system as set forth in claim 19 wherein said plurality of air nozzles are independently pivotally adjustable relative to the conveyor pathway for facilitating adjustment of a direction of each stream of air.

21. A conveyor system as set forth in claim 9 wherein the at least one air nozzle is located generally laterally outside the curve of the conveyor pathway and is oriented for directing a stream of air generally from an outside region of the curve of the conveyor pathway to an inside region of the curve.

* * * * *